(12) United States Patent
Thompson

(10) Patent No.: US 12,069,158 B1
(45) Date of Patent: Aug. 20, 2024

(54) METHODS OF PASSIVE DATA ENCRYPTION AND A PASSIVE DATA ENCRYPTION SYSTEM BY KEYCHAIN ACTIVATED DATA OBJECT KEY UTILIZING HIGH BIT SIZE AES AND SHA ENCRYPTION STANDARDS

(71) Applicant: Thomas David Thompson, Houston, TX (US)

(72) Inventor: Thomas David Thompson, Houston, TX (US)

( * ) Notice: Subject to any disclaimer, the term of this patent is extended or adjusted under 35 U.S.C. 154(b) by 283 days.

(21) Appl. No.: 17/348,454

(22) Filed: Jun. 15, 2021

Related U.S. Application Data

(60) Provisional application No. 63/153,789, filed on Feb. 25, 2021.

(51) Int. Cl.
| | | |
|---|---|---|
| *G06F 21/00* | (2013.01) | |
| *H04L 9/06* | (2006.01) | |
| *H04L 9/08* | (2006.01) | |
| *H04L 9/00* | (2022.01) | |

(52) U.S. Cl.
CPC .......... *H04L 9/0631* (2013.01); *H04L 9/0643* (2013.01); *H04L 9/0863* (2013.01); *H04L 9/50* (2022.05)

(58) Field of Classification Search
CPC ... H04L 9/0631; H04L 9/0643; H04L 9/0863; H04L 9/50
See application file for complete search history.

(56) References Cited

U.S. PATENT DOCUMENTS

| | | | |
|---|---|---|---|
| 10,922,024 B1* | 2/2021 | Thomas | G06F 3/0619 |
| 2018/0013562 A1* | 1/2018 | Haider | G06F 16/951 |
| 2019/0392065 A1* | 12/2019 | Bangalore Ananthakumar | G06F 16/2228 |
| 2021/0152351 A1* | 5/2021 | Anson | H04L 9/0869 |

* cited by examiner

*Primary Examiner* — Shin-Hon (Eric) Chen
*Assistant Examiner* — Vladimir I Gavrilenko
(74) *Attorney, Agent, or Firm* — Plager Schack LLP; Mark H. Plager; Stephen Hallberg

(57) ABSTRACT

A system and method of passive data encryption through keychain activated data object key utilizing AES-256 and SHA-256 encryption standards is disclosed. The system and method of passive data encryption through keychain activated data object key utilizing AES-256 and SHA-256 encryption standards allows for passive data encryption to occur without the need of logging in. The passcode key cannot also be copied the same way a session ID token is able to be copied. The key is encrypted as a data file and not a string in either plain text or the hash code produced.

14 Claims, 5 Drawing Sheets

METHODS OF PASSIVE DATA ENCRYPTION AND A PASSIVE DATA ENCRYPTION SYSTEM BY KEYCHAIN ACTIVATED DATA OBJECT KEY UTILIZING HIGH BIT SIZE AES AND SHA ENCRYPTION STANDARDS

CLAIM OF BENEFIT TO PRIOR APPLICATION

This application claims benefit to U.S. Provisional Patent Application 63/153,789, entitled "PASSIVE DATA ENCRYPTION SYSTEM BY KEYCHAIN ACTIVATED DATA OBJECT KEY UTILIZING AES-256 AND SHA-256 ENCRYPTION STANDARDS," filed Feb. 25, 2021. The U.S. Provisional Patent Application 63/153,789 is incorporated herein by reference.

BACKGROUND

Embodiments of the invention described in this specification relate generally to applied encryption, and more particularly, to a methods of passive data encryption and a passive data encryption system by keychain activated data object key utilizing high bit size AES and SHA encryption standards, namely, a minimum of AES-256 and SHA-256 encryption standards.

User credentials from logins can be copied by others. When such login credentials are copied, they can also be distributed to others who may then access secure data. Also the data is usually never encrypted and thereby has the means of being stolen without having to do much work in deciphering what is in the file.

Therefore, what is needed is a way to minimize exposure of user login credentials when required for account access but which may compromise account security by such possible exposure due to the user inputting the login credentials or due to a file or object that stores string values of readable passwords or passcodes associated with the user credentials.

BRIEF DESCRIPTION

Novel methods of passive data encryption and a novel passive data encryption system by keychain activated data object key utilizing high bit size AES and SHA encryption standards are disclosed with a minimum of AES-256 and SHA-256 encryption standards utilized. In some embodiments, the methods of passive data encryption and the passive data encryption system allows passive data encryption to occur without requiring logging in by a user. Furthermore, the methods of passive data encryption and the passive data encryption system prevents copying of the passcode key in the same manner commonly used to copy a session ID token because the passcode key is encrypted as a data file and not as a string in either plain text or the hash code. In this way, the user is not required to login every time into their account and instead has a keychain that assigns the passcode to the encryption scheme.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having thus described the invention in general terms, reference is now made to the accompanying drawings, which are not necessarily drawn to scale, and which show different views of different example embodiments.

Figure 1:
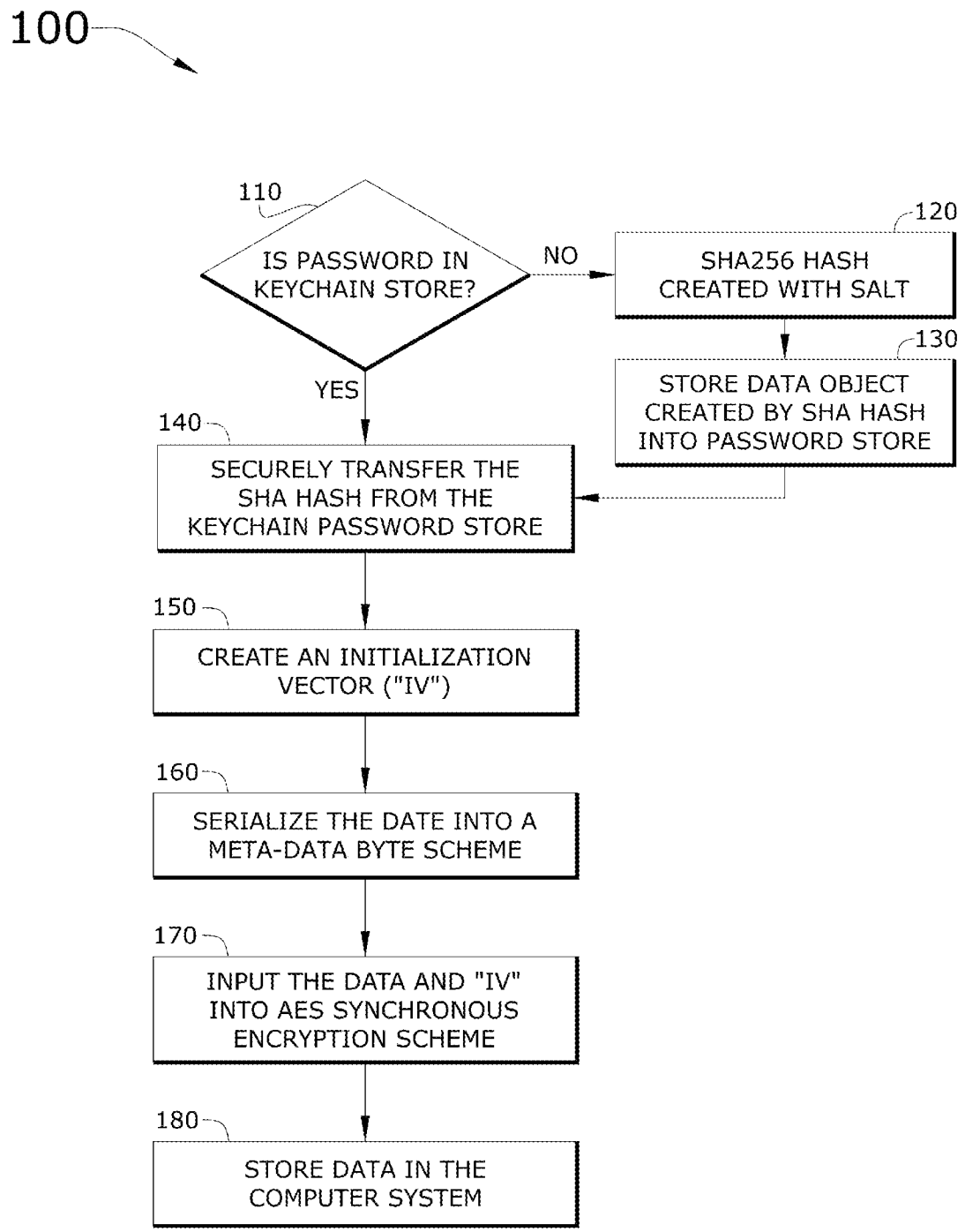

FIG. 1 conceptually illustrates a keychain creation and saving process for passive data encryption by keychain activated data object key utilizing AES-256 and SHA-256 encryption standards in some embodiments.

Figure 2:
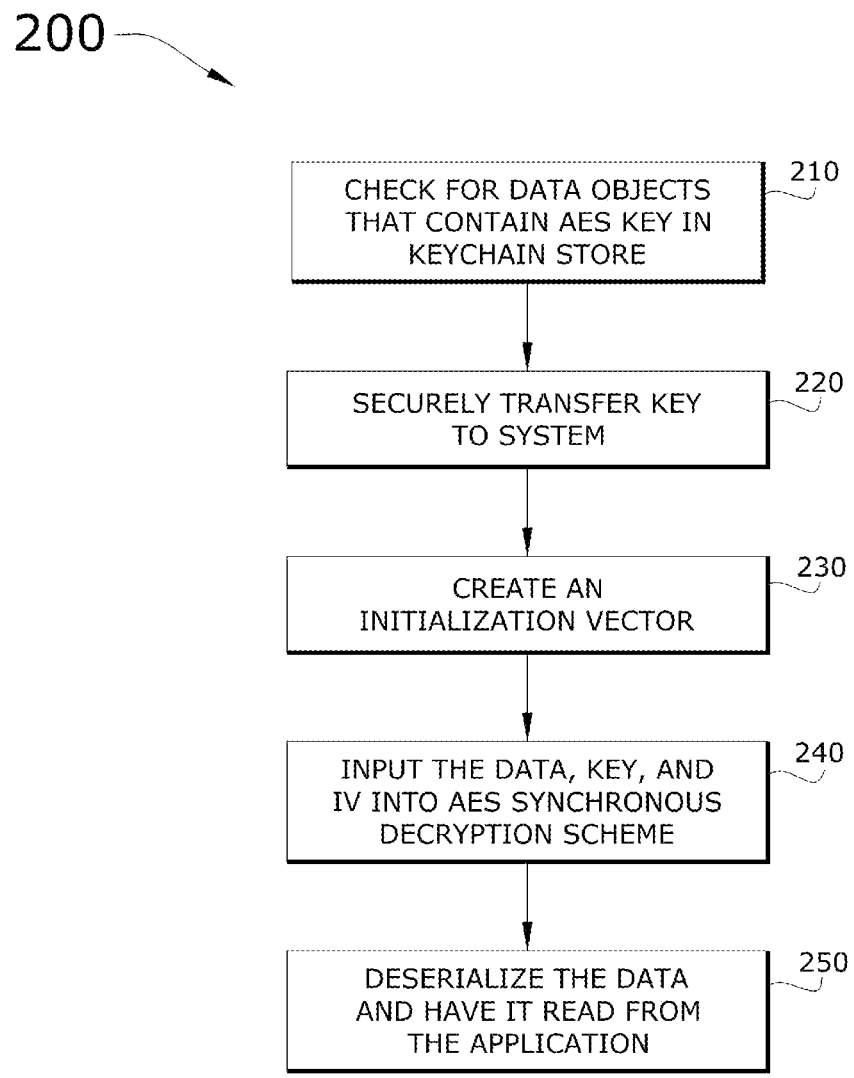

FIG. 2 conceptually illustrates a data reading process for passive data encryption by keychain activated data object key utilizing AES-256 and SHA-256 encryption standards in some embodiments.

Figure 3:
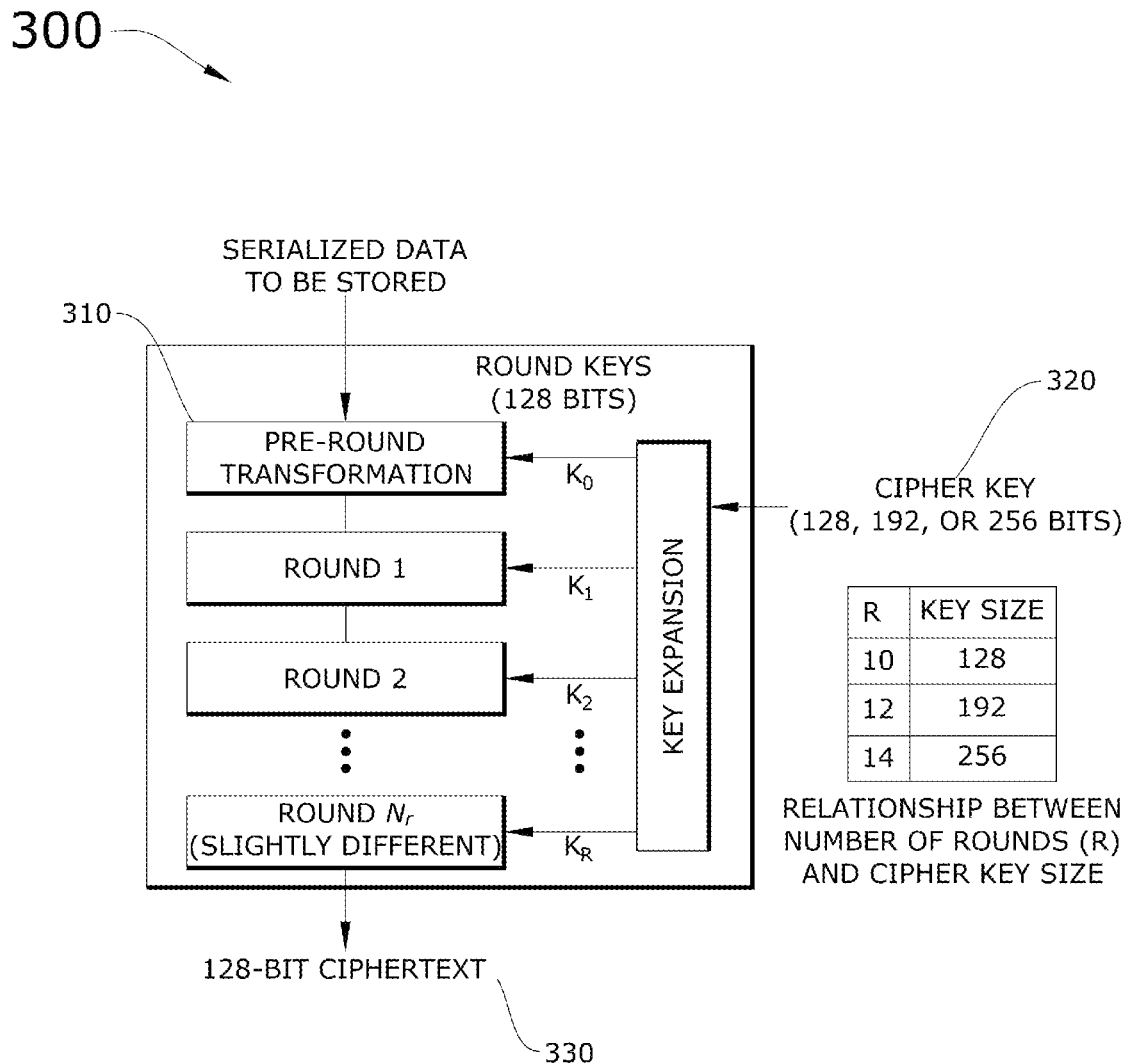

FIG. 3 conceptually illustrates a schematic view of AES with components for a passive data encryption system in some embodiments.

Figure 4:
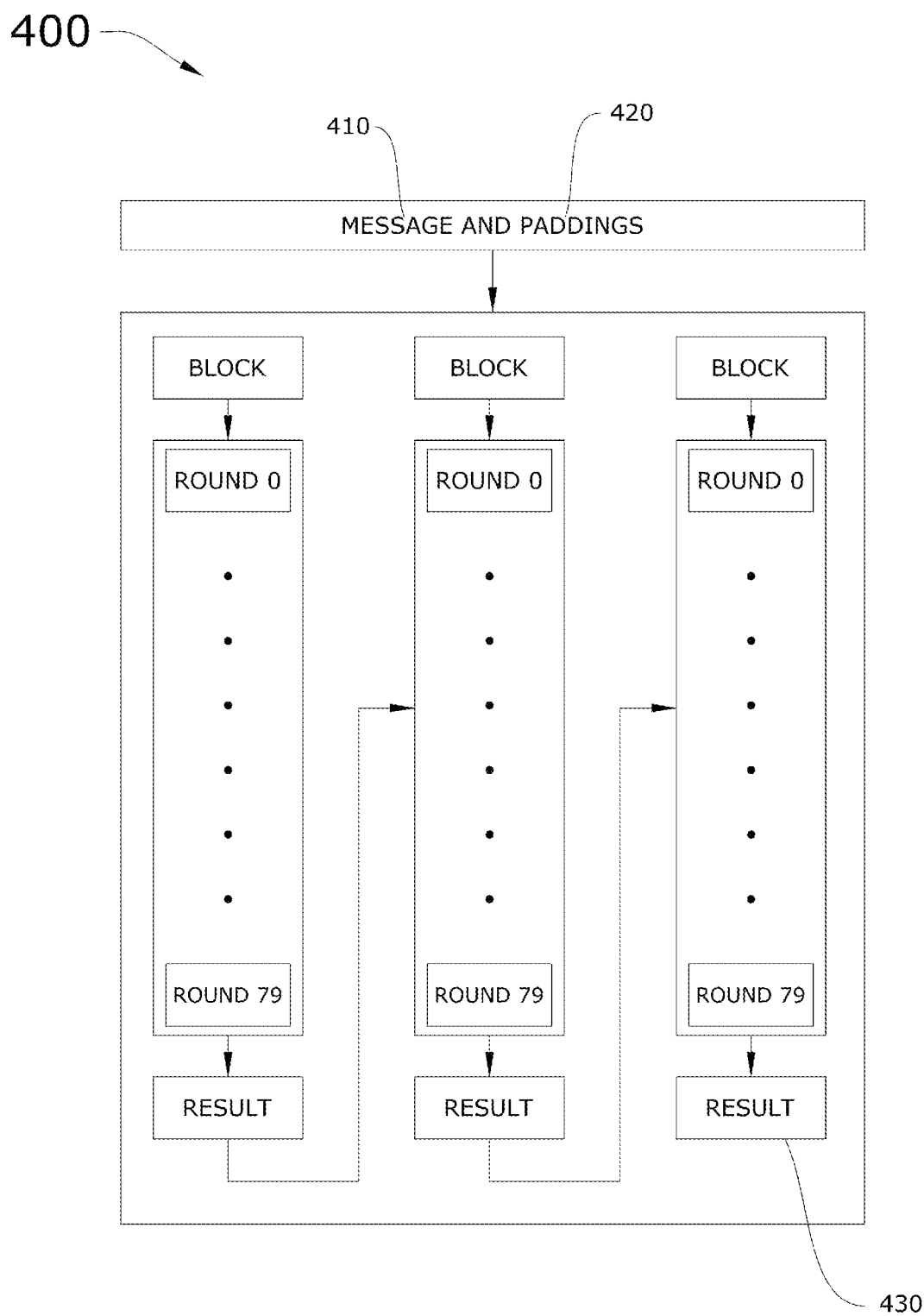

FIG. 4 conceptually illustrates a schematic view of SHA-256 password data of a passive data encryption system in some embodiments.

Figure 5:
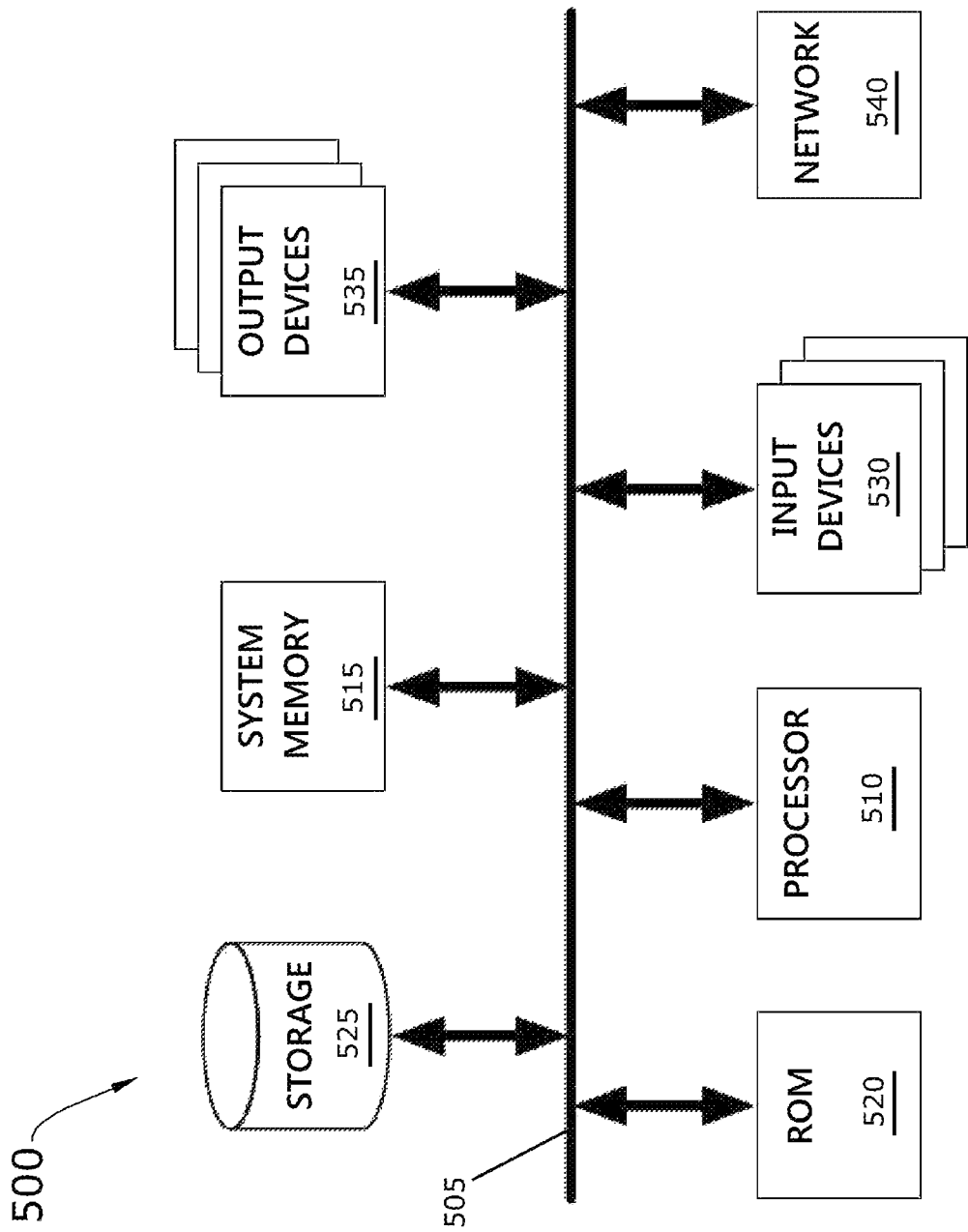

FIG. 5 conceptually illustrates an electronic system with which some embodiments of the invention are implemented.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments include novel methods of passive data encryption by keychain activated data object key utilizing high bit size AES and SHA encryption standards and a novel passive data encryption system by keychain activated data object key utilizing high bit size AES and SHA encryption standards. In some embodiments, the high bit size AES and SHA encryption standards comprises minimum AES-256 and SHA-256 encryption standards. In some embodiments, the high bit size AES and SHA encryption standards are the same high bit size. For instance, AES-256 and SHA-256 utilize a same bit size (256 bits) for their respective encryption schemes, while AES-512 and SHA-512 utilize a same bit size (512 bits) that is different from the bit sizes utilized by the AES-256 and SHA-256 encryption schemes. In some embodiments, the methods of passive data encryption and the passive data encryption system by keychain activated data object key utilizing high bit size AES and SHA encryption standards allows passive data encryption to occur without requiring logging in by a user. Furthermore, the methods of passive data encryption and the passive data encryption system by keychain activated data object key utilizing high bit size AES and SHA encryption standards prevents copying of the passcode key in the same manner commonly used to copy a session ID token because the passcode key is encrypted as a data file and not as a string in either plain text or the hash code. In this way, the user is not required to login every time into their account and instead has a keychain that assigns the passcode to the encryption scheme.

As stated above, logins can be copied by others, they can also be distributed to many individuals allowing others to obtain your secure data. Also the data is usually never encrypted and thereby has the means of being stolen without having to do much work in deciphering what is in the file. Embodiments of the methods of passive data encryption and the passive data encryption system by keychain activated data object key utilizing high bit size AES and SHA encryption standards described in this specification solve the problem of passively encrypting backups without the need to login for a password or passcode as it utilizes a data object instead of actual text (plain text) through an individual's keychain. Passive encryption makes it so that the user's passcode is not compromised and is able to keep the data within a file completely locked away from reading or access of others. The user also does not have to login every time into their account and instead has a keychain that assigns the passcode to the encryption scheme. Therefore, no one could copy and paste the password to unlock your data and it remains secure while passively encrypting new data that is saved and stored.

Embodiments of the methods of passive data encryption and the passive data encryption system by keychain activated data object key utilizing high bit size AES and SHA encryption standards described in this specification differ from and improve upon currently existing options. In particular, passive encryption does not presently exist in the field. While there are keychain stores that contain pass codes to various areas that can remain hidden, they usually do not operate where they store the passcode as a data object instead of a string (in plain text or hash code), which is more common. Usually a session ID token is produced and a user using that application can access the information. This is problematic, however, because this file can be copied and a hacker can then use the information. By contrast, the methods of passive data encryption and the passive data encryption system by keychain activated data object key utilizing high bit size AES and SHA encryption standards of the present disclosure solves this problem by continuous encryption existing with a data object that is itself also encrypted and which cannot be saved as a session ID token that can be copied by hackers.

In addition, embodiments of the methods of passive data encryption and the passive data encryption system by keychain activated data object key utilizing high bit size AES and SHA encryption standards improve upon the currently existing options such as user input actions in which a user types in a pass code for login. Existing systems are also problematic because a person passing by or nearby the user who is typing in a password can easily view what the user is typing in and copy that information. However, the methods of passive data encryption and the passive data encryption system by keychain activated data object key utilizing high bit size AES and SHA encryption standards described in this specification allows for passive data encryption to occur without requiring the user to input a passcode to login. The passcode key is encrypted as a data file and, therefore, cannot also be copied the same way that a session ID token is able to be copied. Since the passcode key is encrypted as a data file, and not a string in either plain text or the hash code produced, the login is able to proceed on the basis of passive data encryption.

The methods of passive data encryption and the passive data encryption system by keychain activated data object key utilizing high bit size AES and SHA encryption standards of the present disclosure may be comprised of the following elements. This list of possible constituent elements is intended to be exemplary only and it is not intended that this list be used to limit the methods of passive data encryption and the passive data encryption system by keychain activated data object key utilizing high bit size AES and SHA encryption standards of the present application to just these elements. Persons having ordinary skill in the art relevant to the present disclosure may understand there to be equivalent elements that may be substituted within the present disclosure without changing the essential function or operation of the methods of passive data encryption and the passive data encryption system by keychain activated data object key utilizing high bit size AES and SHA encryption standards.

1. Keychain Password Store communicably connected to or part of a server
2. Data Object (with key)
3. Application running on a computing device
4. Creation of an initialization vector (IV)
5. Salt (paddings) for SHA encryption algorithm (can be constants or custom entirely)
6. The data, the key, and the IV used in the AES synchronous decryption scheme The various elements of the methods of passive data encryption and the passive data encryption system by keychain activated data object key utilizing high bit size AES and SHA encryption standards of the present disclosure may be related in the following exemplary fashion. It is not intended to limit the scope or nature of the relationships between the various elements and the following examples are presented as illustrative examples only. A keychain password store (1) is included in a server that is accessible to the computing device to see if a key has been stored. If a key has not been stored, the computing device prompts the user to input a password. Once the user has inputted the password, a key is generated using a SHA encryption scheme (e.g., a SHA-256 encryption scheme) and a salt is auto-generated as well. The data object with the password key is then saved to the keychain password store (1). Next, when the user has completed work in the application (3) running on the computing device, and upon saving the work, the data is serialized first, then the data to be stored is encrypted using an AES encryption scheme with a 256-bit key (or rather, a key with a bit size matching the bit size of the SHA encryption scheme). First the data (including regular data of any size or scope along with, or without, meta-data) is serialized, then an initialization vector is generated and utilizes the key that was generated using the SHA encryption scheme (e.g., SHA-256 encryption scheme) utilizing an AES encryption scheme outputting an encrypted data object (2) that is stored to the computing device or a server. Upon reading the data object (2), the computing device checks the server (e.g., via an internet connection if the server is remote) for the stored data object in the keychain password store (1). Upon accessing the data object (2), the data object (2) is transmitted securely to the computing device. An AES encryption scheme is utilized with the data object (2) transmitted from the keychain password store (1) and the stored data and decrypted using an initialization vector that is generated by the computing device. The application (3) running on the computing device is then able to de-serialize and access the data. The key hashed from SHA encryption scheme (e.g., SHA-256) must match the size used in the AES encryption scheme. The minimum size is 256 bits for the key and AES-256 encryption.

The methods of passive data encryption and the passive data encryption system by keychain activated data object key utilizing high bit size AES and SHA encryption standards of the present disclosure generally works by a software implementation of operations to modify and store securely any form of data that is to be saved to a system passively without the user having to login every time in order to save the data. The methods of passive data encryption and the passive data encryption system by keychain activated data object key utilizing high bit size AES and SHA encryption standards uses a keychain store with a data object file which is created utilizing the SHA and AES encryption schemes (e.g., SHA-256 and AES-256 encryption schemes, or SHA-512 and AES-512 encryption schemes, etc.). As noted above, the encryption schemes work with other encryption standards and other key sizes, so long as the SHA bit length/size and the AES bit length/size are equivalent (e.g., both being 256 bits, both being 512 bits, etc.). The key itself is created using SHA-256 and a salt that encrypts an initial plain text version of the password. This is then stored into a keychain password store as just the data object itself, not the plain text password. The data object is accessed securely and is capable of decrypting the data without the user having to input a password to read the data. This allows the data to remain encrypted but still readable by a user without having to login to their respective account in an application to access the data, it instead is accessed through their keychain password store.

To make the methods of passive data encryption and the passive data encryption system by keychain activated data object key utilizing high bit size AES and SHA encryption standards of the present disclosure, a software engineer would add it to their software application suite. From there they would program the methods of passive data encryption and the passive data encryption system by keychain activated data object key utilizing high bit size AES and SHA encryption standards to utilize the technology to accomplish the task of encrypting the data and reading/writing the key from a keychain password store. In this way, the methods of passive data encryption and the passive data encryption system by keychain activated data object key utilizing high bit size AES and SHA encryption standards can be useful in any area where a user is passively using a system without having to actively login by user input, such as by using a RFID system or something like it.

To use the methods of passive data encryption and the passive data encryption system by keychain activated data object key utilizing high bit size AES and SHA encryption standards of the present disclosure, a user would simply input a password one time. For example, the user may interact with a password prompt of an application and input a password string—but just the initial time when creating the passcode or password. The user should only memorize what the password is, but other than this preliminary actions, the user is free. The rest would be done on the backend internally within a system to ensure the data is secure, encrypted, and stored/read from properly. This saves the user the hassle of having to login to an application, be it a mobile device app or a desktop computer system application, while keeping their data secure from hackers seeking to read their data.

In some embodiments, the methods of passive data encryption by keychain activated data object key utilizing high bit size AES and SHA encryption standards comprise a keychain creation and saving process for passive data encryption by keychain activated data object key utilizing AES-256 and SHA-256 encryption standards. In some embodiments, the keychain creation and saving process for passive data encryption by keychain activated data object key utilizing AES-256 and SHA-256 encryption standards is applicable when utilizing AES and SHA encryption schemes that have different bit sizes, such as AES-512 and SHA-512. The keychain creation and saving process for passive data encryption by keychain activated data object key utilizing AES-256 and SHA-256 encryption standards is described further below, by reference to FIG. 1.

In some embodiments, the methods of passive data encryption by keychain activated data object key utilizing high bit size AES and SHA encryption standards further comprise a data reading process for passive data encryption by keychain activated data object key utilizing AES-256 and SHA-256 encryption standards. In some embodiments, the data reading process for passive data encryption by keychain activated data object key utilizing AES-256 and SHA-256 encryption standards is applicable when utilizing AES and SHA encryption schemes that have different bit sizes, such as AES-512 and SHA-512. The data reading process for passive data encryption by keychain activated data object key utilizing AES-256 and SHA-256 encryption standards is described further below, by reference to FIG. 2.

By way of example, FIG. 1 conceptually illustrates a keychain creation and saving process 100 for passive data encryption by keychain activated data object key utilizing AES-256 and SHA-256 encryption standards in some embodiments. As shown in this figure, the keychain creation and saving process 100 starts by determining (at 110) whether a password is in a keychain store. When the password is in the keychain store, the keychain creation and saving process 100 transitions to a step for securely transferring the SHA-256 hash from the keychain password store (at 140), which is described further below.

On the other hand, when the password is not in the keychain store, the keychain creation and saving process 100 creates a SHA-256 hash with salt (at 120). The SHA-256 hash with salt is a passcode message with paddings. After the SHA-256 hash is created with salt, the keychain creation and saving process 100 of some embodiments proceeds to the next step of storing a data object created by the SHA-256 hash into a password store (at 130). Then the keychain creation and saving process 100 continues to the next step of securely transferring the SHA-256 hash from the keychain password store (at 140).

As noted above, the keychain creation and saving process 100 proceeds to the step for securely transferring the SHA-256 hash from the keychain password store (at 140) under one of two outcomes, namely, when the password is determined (at 110) to be in the keychain store or when the SHA-256 hash is created with salt (at 120) and the data object created by the SHA-256 hash is stored in the password store (at 130). After transferring the SHA-256 hash from the keychain password store (at 140), the keychain creation and saving process 100 of some embodiments creates an initialization vector (at 150). The initialization vector created by the keychain creation and saving process 100 is also referred to by the acronym "IV".

In some embodiments, after creating the initialization vector (at 150), the keychain creation and saving process 100 serializes the data into a meta-byte scheme (at 160). Next, the keychain creation and saving process 100 inputs the data and the IV into an AES synchronous encryption scheme (at 170). After this, the keychain creation and saving process 100 of some embodiments stores the data in the computer system (at 180). Then the keychain creation and saving process 100 ends.

Now referring to another example flow chart, FIG. 2 conceptually illustrates a data reading process 200 for passive data encryption by keychain activated data object key utilizing AES-256 and SHA-256 encryption standards in some embodiments. As shown in this figure, the data reading process 200 starts by checking for data objects that contain the AES key in the keychain store (at 210). In some embodiments, the data reading process 200 securely transfers the key to the system (at 220). Next, the data reading process 200 of some embodiments creates (at 230) an initialization vector ("IV"). In some embodiments, the data reading process 200 inputs the data, the key, and the IV into the AES synchronous decryption scheme (at 240). Once these steps are complete, the data reading process 200 of some embodiments de-serializes (at 250) the data and has it read from the application. Then the data reading process 200 ends.

Turning to FIG. 3, a schematic view of AES with components for a passive data encryption system 300 is conceptually illustrated. As shown in this figure, the view of AES with the components for the passive data encryption system 300 starts with serialized data to be stored, performs a pre-round transformation of the data using a cipher key (e.g., a SHA-256 bit key), performs a plurality of rounds of further transformation by key expansion using slightly different sized cipher keys for each round, and outputs 128-bit cipher-text. Specifically, an initialization vector 310 is created in the passive data encryption system 300 during the pre-round transformation. The cipher key 320 used at each round is from a data object that is encrypted with SHA-256 from a keychain data store. The 128-bit cipher-text output is an encrypted data object 330 that is stored.

In connection with the examples above, FIG. 4 conceptually illustrates a schematic view of SHA-256 password data of a passive data encryption system 400. As shown in this figure, the SHA-256 password data of the passive data encryption system 400 includes a plain-text passcode (message) entered by a user 410 and salt (paddings) generated by the user or the system 420, both of which are input into the system and processed over several rounds to output a resulting data object to be stored in a password keystone used as a key in AES 430.

The above-described examples of the methods of passive data encryption and the passive data encryption system by keychain activated data object key utilizing high bit size AES and SHA encryption standards are presented for purposes of illustration and not of limitation. Nevertheless, the examples above demonstrate that user/login credentials which are used to access secure data are often at risk of exposure to others, but that a keychain activated data object key—with strong encryption, such as AES-256 and SHA-256 encryption standards at a minimum—allows for passive data encryption without requiring user login, password input, passcode entry, etc. When utilized in connection with a passive data encryption system, copying of session ID tokens is not possible because the passcode key being used is actually encrypted as a data file, not as a string value (whether in plain text or hash code). Also, as noted above, the methods of passive data encryption and the passive data encryption system by keychain activated data object key utilizing high bit size AES and SHA encryption standards involve one or more computing devices (computers, servers, etc.). Specifically, the processes described above by reference to FIGS. 1 and 2 are implemented as programs, modules, applications, and/or scripts which run on one or more processing unit(s) of the computing devices. Also, the examples and descriptions above are not limited to only the steps of these processes or their implementations and, therefore, a person skilled in the relevant art would appreciate that such implementations are only exemplary, and not to be construed as the only implementations of the system and processes of the inventive embodiments described herein.

Accordingly, in this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 5 conceptually illustrates an electronic system 500 with which some embodiments of the invention are implemented. The electronic system 500 may be a computer, a server, a mobile computing device, a tablet computing device, or any other sort of electronic device. Such an electronic system includes various types of computer readable media and interfaces for various other types of computer readable media. Electronic system 500 includes a bus 505, processing unit(s) 510, a system memory 515, a read-only memory 520, a permanent storage device 525, input devices 530, output devices 535, and a network 540.

The bus 505 collectively represents all system, peripheral, and chipset buses that communicatively connect the numerous internal devices of the electronic system 500. For instance, the bus 505 communicatively connects the processing unit(s) 510 with the read-only memory 520, the system memory 515, and the permanent storage device 525.

From these various memory units, the processing unit(s) 510 retrieves instructions to execute and data to process in order to execute the processes of the invention. The processing unit(s) may be a single processor or a multi-core processor in different embodiments.

The read only memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some embodiments of the invention use a mass-storage device (such as a magnetic or optical disk and its corresponding disk drive) as the permanent storage device 525.

Other embodiments use a removable storage device (such as a flash drive) as the permanent storage device 525. Like the permanent storage device 525, the system memory 515 is a read-and-write memory device. However, unlike the permanent storage device 525, the system memory 515 is a volatile read-and-write memory, such as a random access memory. The system memory 515 stores some of the instructions and data that the processor needs at runtime. In some embodiments, the invention's processes are stored in the system memory 515, the permanent storage device 525, and/or the read only memory 520. For example, the various memory units include instructions for processing appearance alterations of displayable characters in accordance with some embodiments. From these various memory units, the processing unit(s) 510 retrieves instructions to execute and data to process in order to execute the processes of some embodiments.

The bus 505 also connects to the input and output devices 530 and 535. The input devices enable the user to communicate information and select commands to the electronic system. The input devices 530 include alphanumeric keyboards and pointing devices (also called "cursor control devices"). The output devices 535 display images generated by the electronic system 500. The output devices 535 include printers and display devices, such as liquid crystal displays (LCD) and organic light emitting diode (OLED) displays. Some embodiments include electronic systems and/or devices that function as both input and output devices, such as touchscreen displays on tablet computing device, computer monitors, and mobile devices.

Finally, as shown in FIG. 5, bus 505 also couples electronic system 500 to a network 540 through a network adapter (not shown). In this manner, the computer can be a part of a network of computers (such as a local area network ("LAN"), a wide area network ("WAN"), or an intranet), or a network of networks (such as the Internet). Any or all components of electronic system 500 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1 and 2 conceptually illustrate processes in which the specific operations of these processes may not be performed in the exact order shown and described. Specific operations may not be performed in one continuous series of operations, and different specific operations may be performed in different embodiments. Furthermore, the processes could be implemented using several sub-processes, or as part of a larger macro process. Additionally, the methods of passive data encryption by keychain activated data object key utilizing high bit size AES and SHA encryption standards and the passive data encryption system by keychain activated data object key utilizing high bit size AES and SHA encryption standards can be adapted for use in other aspects. For example, it would be possible to encrypt/decrypt binary programs and utilize them at time of need by an operating system. In this way, crawlers used in malware installations, such as those which may have taken down systems in the pipeline system recently, would be unable to effectively install into the system. Thus, one of ordinary skill in the art would understand that the invention is not to be limited by the foregoing illustrative details, but rather is to be defined by the appended claims.

I claim:

1. A method of passive data encryption through a keychain activated data object utilizing 256-bit encryption standards comprising AES-256 and SHA-256, said method comprising:
   generating a password key using a SHA-256 encryption scheme and an automatically generated salt to encrypt an initial plain text password associated with a user interacting with an application that is running on a computing device;
   storing a data object with the password key to a keychain password store of a server;
   serializing data to be stored, wherein the data to be stored is application data updated in the application while the user is interacting with the application;
   performing a pre-round transformation of the serialized data to be stored using a cipher key of a particular cipher key size from the data object stored in the keychain password store, wherein the pre-round transformation of the serialized data generates an initialization vector;
   performing key expansion of the cipher key to create a plurality of different sized cipher keys that are used during a number of rounds of further transformations of the serialized data, wherein the number of rounds depends on the particular cipher key size of the cipher key;
   outputting 128-bit cipher-text as an encrypted data object using an AES password key generated by an AES-256 encryption scheme, wherein the AES password key is stored in an AES password data object to the keychain password store of the server;
   storing the encrypted data object on the computing device;
   checking the server for the stored data object and the AES password data object in the keychain password store of the server;
   securely transferring the stored data object and the AES password data object from the keychain password store of the server to the application running on the computing device;
   decrypting the encrypted data object at the computing device using the initialization vector, the AES password data object, and the stored data object; and
   de-serializing the data of the decrypted data object in the application running on the computing device.

2. The method of passive data encryption through a keychain activated data object utilizing 256-bit encryption standards comprising AES-256 and SHA-256 of claim 1 further comprising receiving the initial plain text password as input by the user at a passcode input prompt of the application running on the computing device operated by the user.

3. The method of passive data encryption through a keychain activated data object utilizing 256-bit encryption standards comprising AES-256 and SHA-256 of claim 2, wherein generating the password key using the SHA-256 encryption scheme comprises generating a hash of the initial plain text password input by the user.

4. The method of passive data encryption through a keychain activated data object utilizing 256-bit encryption standards comprising AES-256 and SHA-256 of claim 2 further comprising saving work ("saved work") performed by the user in the application running on the computing device, wherein the application data updated in the application comprises the saved work.

5. The method of passive data encryption through a keychain activated data object utilizing 256-bit encryption standards comprising AES-256 and SHA-256 of claim 4, wherein serializing data comprises serializing data associated with the saved work in the application and additional meta-data for the application.

6. The method of passive data encryption through a keychain activated data object utilizing 256-bit encryption standards comprising AES-256 and SHA-256 of claim 1 further comprising outputting decrypted data of the encrypted data object by applying the password key to the initialization vector.

7. The method of passive data encryption through a keychain activated data object utilizing 256-bit encryption standards comprising AES-256 and SHA-256 of claim 1, wherein the AES encryption scheme is used to encrypt the serialized data with a 256-bit key.

8. The method of passive data encryption through a keychain activated data object utilizing 256-bit encryption standards comprising AES-256 and SHA-256 of claim 1, wherein the password key generated from the SHA-256 encryption scheme matches a bit size used in the AES encryption scheme.

9. The method of passive data encryption through a keychain activated data object utilizing 256-bit encryption standards comprising AES-256 and SHA-256 of claim 8, wherein a minimum bit size comprises 256 bits for the password key and the bit size used in the AES encryption scheme.

10. The method of passive data encryption through a keychain activated data object utilizing 256-bit encryption standards comprising AES-256 and SHA-256 of claim 1 further comprising accessing the data object by the user interacting with the application.

11. The method of passive data encryption through a keychain activated data object utilizing 256-bit encryption standards comprising AES-256 and SHA-256 of claim 1, wherein the serialized data to be stored comprises data associated with user work in the application.

12. The method of passive data encryption through a keychain activated data object utilizing 256-bit encryption standards comprising AES-256 and SHA-256 of claim 11, wherein the serialized data to be stored further comprises meta-data corresponding to the data that is associated with user work in the application.

13. The method of passive data encryption through a keychain activated data object utilizing 256-bit encryption standards comprising AES-256 and SHA-256 of claim 11, wherein de-serializing the data in the data object comprises de-serializing the data by the application running on the computing device.

14. The method of passive data encryption through a keychain activated data object utilizing 256-bit encryption standards comprising AES-256 and SHA-256 of claim 13 further comprising accessing the de-serialized data, by the user, in the application running on the computing device.

* * * * *